March 3, 1959
G. F. HENDERSON
2,875,841
MOTOR VEHICLE CONSTRUCTION
Filed Jan. 19, 1955
2 Sheets-Sheet 1
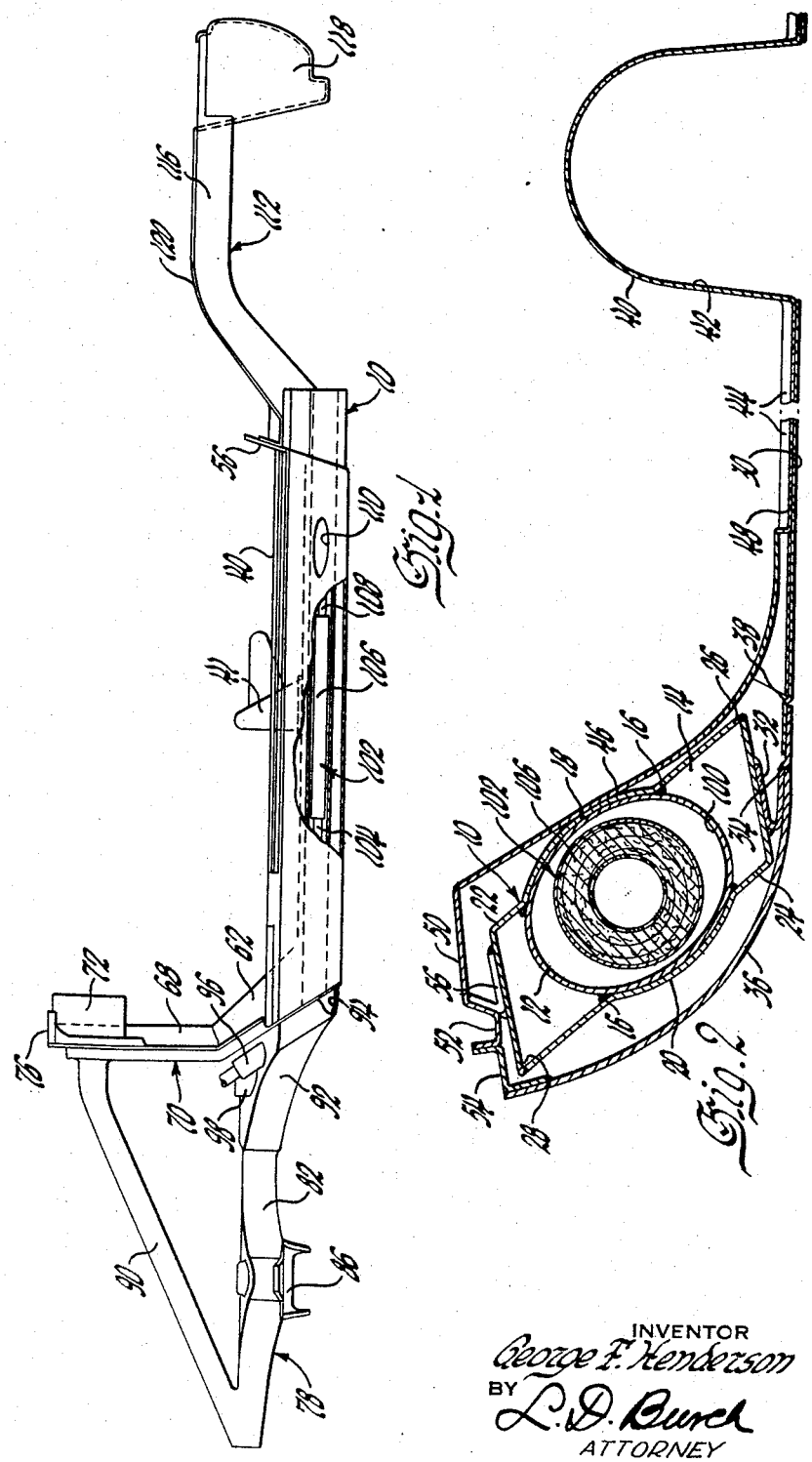
INVENTOR
George F. Henderson
BY
L. D. Burch
ATTORNEY

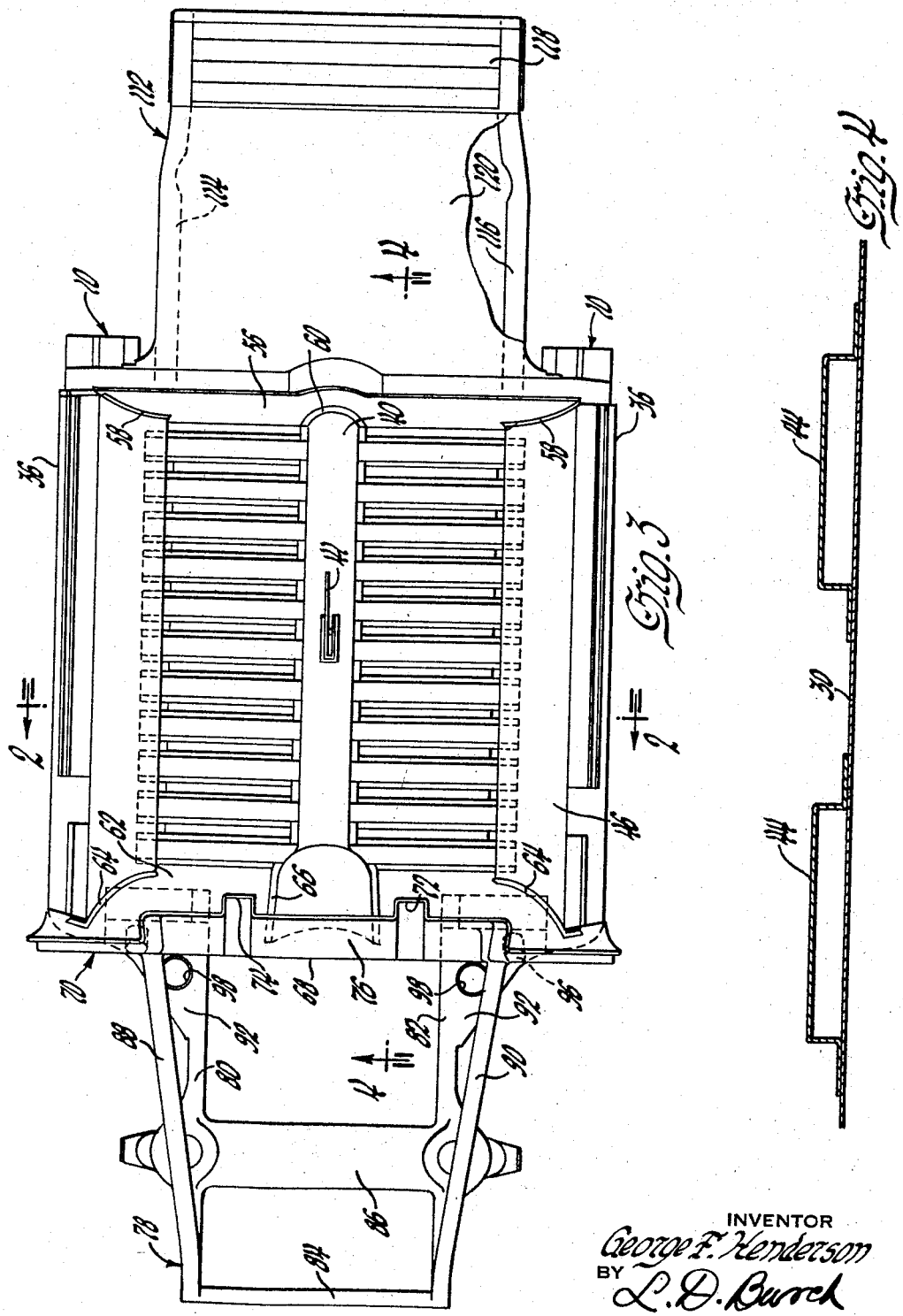

United States Patent Office 2,875,841
Patented Mar. 3, 1959

2,875,841

MOTOR VEHICLE CONSTRUCTION

George F. Henderson, Detroit, Mich., assignor to General Motors Corporation, Detroit, Mich., a corporation of Delaware Application January 19, 1955, Serial No. 482,731

6 Claims. (Cl. 180—64)

This invention relates to vehicle construction in general and more particularly to integral or unitary frame and underbody construction for vehicle and other use.

It has been previously proposed to eliminate the frame member in vehicle constructions, as such, by providing a vehicle underbody of sufficient structural strength to support the vehicle body, drive components, suspension systems, and the like. Although numerous types of integral frame and underbody constructions have been proposed, few have been adaptable for production use. It is desirable that the integral frame and underbody not only be structurally sound, but that it be easy to fabricate, include low cost materials, provide a reduction in vehicle weight, and include certain design advantages. Among the design advantages are a wider and lower vehicle passenger compartment floor. This in turn presents problems relative to the disposition of drive and exhaust means formerly extended beneath the vehicle underbody and as to the disposition of the fuel tank and other members also affected by a lower vehicle construction.

It is now proposed to provide an integral or unitary frame and underbody construction particularly adaptable for automotive vehicle use and which may be made from sheet materials to include the required structural strength. It is proposed to provide an underbody-frame construction having longitudinal, lateral and torsional rigidity. The unitary construction includes tubular structural members built into the sides of the underbody for longitudinal strength and reinforced for greater torsional resistance. The underbody is formed to provide a floor pan having end walls for lateral stiffness and including a channel section centrally the length thereof which accommodates the vehicle drive shaft and provides further structural strength. Maximum load capacity is provided for the vehicle passenger compartment floor by including transverse stiffening means tying the structural sides and center section together.

It is proposed to provide an underbody forming a passenger compartment floor of minimum thickness to allow for a lower floor level. Forward and rear frame sections or outriggers are secured to the ends of the integral underbody-frame and are adapted to receive the vehicle suspension members, drive means, fuel tank and other components. The forward frame section is structurally braced to the vehicle cowl provided upon the underbody and is formed to accommodate blower and exhaust means which may be connected to the passages formed by the longitudinal tubular side members included in the underbody. The engine gas exhaust means are disposed within the tubular side members rather than under the vehicle as previously arranged.

In the drawings:

Figure 1 is a side elevational view of the proposed vehicle underbody-frame.

Figure 2 is an enlarged cross-sectional view of part of the underbody-frame as seen in the plane of line 2—2 of Figure 3 looking in the direction of the arrows thereon.

Figure 3 is a top plan view of the proposed integral frame and underbody.

Figure 4 is an enlarged cross-sectional view taken in the plane of line 4—4 of Figure 3 looking in the direction of the arrows thereon and showing the floor pan construction.

The integral vehicle frame and underbody shown by the drawings includes a pair of parallel spaced side rails 10 which comprise an elongated tubular member 12 secured within a closed channel member 14. The tubular member 12 is curvilinear in cross section and is welded as at 16 to the sides of the closed channel member 14 which are formed to receive the tubular member as at 18 and 20. The channel member 14 is made from complementary angle members 22 and 24 which are welded together as at 26 and 28.

The side rails 10 are secured to the passenger compartment floor pan 30 by means of elongated support brackets 32. The support brackets are secured to the underside of the side rails 10 and are reversely formed and stepped as at 34 to receive the floor pan 30. The rocker panel 36 is also secured to the support bracket and bears against the shoulder formed by the stepped portion 34 thereof. The floor pan 30 is stepped as at 38 to provide a flush undersurface with the bracket 32 and rocker panel 36 and includes an arched or channeled section 40 extended parallel to the side rails 10. The channeled section 40 is provided to accommodate the vehicle drive shaft (not shown) as extended under the vehicle frame and underbody. The tunnel 42 formed by the channel section 40, however, actually houses the drive shaft above the lower limit of the floor pan. A hand brake support 41 is secured to the tunnel.

The floor pan 30 is stiffened by a plurality of channel or hat section brace rails 44 which are secured to the floor pan between the side rails 10 and drive shaft channeled section 40. The stiffening means 44 are disposed in parallel equally spaced relation. Floor pan inner side walls 46 are secured to the floor pan 30 over the stiffening rails 44 and therebetween by stepped tabs 48 extended between the braces. The corrugated compartment floor provides considerable load capacity. Pad strips (not shown) are placed between the stiffeners 44 and a full floor pad and carpet are disposed thereover in the finished assembly.

The side walls 46 are formed to provide a door sill ledge 50 and a strengthening channel section 52 which has a sill runner 54 secured thereto and to the rocker panel 36. The side walls 46 are secured to the tops of the side rails 10 by elongated fastener strips 56. An ornamental door sill (not shown) may be secured over the door sill ledge 50 to lie flush with the rocker panel 36.

The passenger compartment floor pan 30 includes an after end wall 56 extended substantially vertical and which has the inner side walls 46 secured thereto as at 58. The drive shaft tunnel section 40 is flanged as at 60 and is also secured thereto. The forward end of the floor pan 30 is formed to provide a toe board 62 having the side walls 46 secured thereto as at 64. The drive shaft tunnel 40 is secured as at 66 to the toe board 62 providing space to accommodate the transmission end of the vehicle engine (not shown). The fire wall 68 is provided over the toe board which, with the toe board, comprises the vehicle cowl section 70. The cowl is formed to provide hood hinge recesses 72 and 74 and the hood ledge 76.

A forward frame section 78 is secured to the vehicle cowl 70 and includes parallel spaced frame rails 80 and 82, disposed inboard of the side rails 10, and including an end cross brace 84 and the engine and suspension support means 86. The frame rails 80 and 82 are braced to the vehicle cowl 70 by frame struts 88 and 90 secured between the ends of the frame rails and the top portion of the cowl.

The ends of the frame rails 80 and 82 secured to the toe board 62 of the vehicle cowl 70 are boxed in, as at 92, to provide chambers 94 connected to the side rails 10. The boxed-in sections 92 include an exhaust gas inlet conduit 96 and a forced air inlet conduit 98.

Within the elongated passages 100 formed by the tubular members 12 of the side rails 10 are disposed exhaust means 102 which include an exhaust conduit 104, exhaust muffler 106 and tail pipe 108. The exhaust means 102 are adapted to be connected to the exhaust system of the vehicle engine (not shown) through the exhaust gas inlet conduit 96 of the boxed-in section 92. The exhaust means 102 are such as is shown and described in detail in the copending application S. N. 482,730 entitled "Exhaust Means" in the name of Maurice A. Thorne, filed Jan. 19, 1955. The boxed-in sections 92 are connected to the tubular side rails 10 to permit the air directed through conduit 98 to circulate about the exhaust means within the passages 100 of the tubular members 12 for cooling the exhaust means. Openings 110 may be provided through the sides of the side rails 10 and rocker panels 36, as shown in Fig. 1, to permit the extension of the tail pipes 108 therethrough, or if desired the tail pipes 108 may be extended through the ends of the side rails.

A rear frame section 112 is secured to the after end wall 56 of the floor pan 30 and includes frame rail members 114 and 116 disposed inboard of the side rails 10. The frame rails 114 and 116 are disposed in parallel spaced relation and are formed to include the rear vehicle wheel kick-ups. The vehicle engine fuel tank 118 is secured between the extended ends of the frame members 114 and 116 and acts as a structural cross brace. The fuel tank 118 is formed from the end of the sheet metal panel 120 which is secured to the end wall 56 of the floor pan and along the frame members 114 and 116 to provide the trunk compartment floor in the finished assembly.

The proposed unitary frame and underbody construction provides for a greater expanse of passenger compartment floor area with the side rails 10 disposed within the rocker panels 36 at the outer sides of the floor pan 30. The compartment floor is below the level of the side rails 10 and is made of sheet material reinforced by stiffeners 44 of minimum height to assure a minimum floor thickness and consequently a lower floor level. The floor pan 30 is further reinforced by the end wall 56 and toe board portion 62 with the drive shaft channeled section 40 extended therebetween.

The claims:

1. An integral vehicle frame and underbody which includes, closed channel side rails disposed in parallel spaced relation, tubular members secured within said side rails to opposite side walls thereof and extended the length thereof, a vehicle floor pan secured to said side rails and disposed therebetween, engine supporting means secured to said floor pan, and exhaust means disposed within said tubular members and adapted to be connected to the exhaust system of a vehicle engine mounted upon said engine supporting means.

2. A vehicle frame and underbody construction including side rail members disposed in parallel spaced relation and having enclosed passageways formed therein, a vehicle cowl secured across the ends of said side rail members and having engine support means secured thereto and extended therebeyond, passage means provided between said side rail members and said engine support means, and engine exhaust means received within said passageways and passage means for connection to a vehicle engine mounted on said support means and for carrying engine exhaust gases therefrom rearwardly of said vehicle through said side rails.

3. A vehicle frame and underbody substantially as provided for by claim 2 and including coolant means mounted upon said engine support means and in communication with said passage means for supplying coolant to said passageways and passage means about said engine exhaust means.

4. A vehicle frame rail comprising an elongated closed box-sectioned member having substantially parallel side walls, an elongated tubular member of curvilinear section disposed within said box-sectioned member and between said side walls, said side walls having a part thereof formed to complement the adjacent wall of said curvilinear-sectioned member and being secured thereto to support said curvilinear-sectioned member centrally within said box-sectioned member and to provide a combination box-sectioned and tubular frame rail support.

5. An integral vehicle frame and underbody including a mid section comprising parallel spaced box-sectioned side rails having tubular members disposed within and secured to opposite side walls thereof throughout the length of said side rails, a vehicle floor pan secured to said side rails and disposed therebetween, said floor pan being formed to provide a drive shaft tunnel section in parallel spaced relation between said side rails and between end walls, means for supporting a vehicle engine secured to one of said end walls and structurally braced and connected to the ends of said side rails next adjacent thereto, and exhaust means disposed within said tubular members of said side rails and being adaptable for connection to the exhaust system of said vehicle engine.

6. The frame and underbody construction of claim 5 having said exhaust means disposed in spaced relation to the walls of said tubular member and including coolant distributing means mounted upon the structural bracing connection between said engine supporting means and said side rails and in communication with said tubular members for distributing coolant therethrough and about said exhaust means.

References Cited in the file of this patent

UNITED STATES PATENTS

| | | |
|---|---|---|
| 668,073 | Worth | Feb. 12, 1901 |
| 1,081,927 | Forsyth | Dec. 16, 1913 |
| 1,112,855 | Sisson | Oct. 6, 1914 |
| 1,677,714 | Frease | July 17, 1928 |
| 1,789,238 | Lancia | Jan. 13, 1931 |
| 2,037,765 | Dart | Apr. 21, 1936 |
| 2,078,420 | Sheldrick | Apr. 27, 1937 |
| 2,107,382 | Maddock | Feb. 8, 1938 |
| 2,112,101 | Kliesrath | Mar. 22, 1938 |
| 2,138,001 | Fluor | Nov. 29, 1938 |
| 2,225,976 | Cadwallader | Dec. 24, 1940 |
| 2,231,586 | Miller | Feb. 11, 1941 |
| 2,254,491 | Olley | Sept. 2, 1941 |
| 2,662,793 | Lindsay | Dec. 15, 1953 |
| 2,668,722 | Muller | Feb. 9, 1954 |
| 2,700,571 | Barenyi | Jan. 25, 1955 |

FOREIGN PATENTS

| | | |
|---|---|---|
| 762,366 | France | Jan. 22, 1934 |
| 717,871 | Germany | Feb. 25, 1942 |
| 743,439 | Germany | Dec. 27, 1943 |